United States Patent
Chang et al.

(10) Patent No.: US 11,044,763 B2
(45) Date of Patent: Jun. 22, 2021

(54) METHOD FOR CONNECTION ESTABLISHMENT USING COMMON RANDOM ACCESS PREAMBLE

(71) Applicants: Henry Chang, San Diego, CA (US); Masato Fujishiro, Yokohama (JP); Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 31 days.

(21) Appl. No.: 16/619,835

(22) PCT Filed: Jun. 22, 2018

(86) PCT No.: PCT/US2018/038980
§ 371 (c)(1),
(2) Date: Dec. 5, 2019

(87) PCT Pub. No.: WO2019/005608
PCT Pub. Date: Jan. 3, 2019

(65) Prior Publication Data
US 2020/0137799 A1    Apr. 30, 2020

Related U.S. Application Data

(60) Provisional application No. 62/527,771, filed on Jun. 30, 2017, provisional application No. 62/649,125, filed on Mar. 28, 2018.

(51) Int. Cl.
*H04W 4/00* (2018.01)
*H04W 74/08* (2009.01)
(Continued)

(52) U.S. Cl.
CPC .... *H04W 74/0833* (2013.01); *H04B 7/18506* (2013.01); *H04W 76/10* (2018.02)

(58) Field of Classification Search
CPC . H04W 74/0833; H04W 76/10; H04W 48/20; H04W 74/006; H04W 84/06; H04B 7/18506; H04L 67/12
See application file for complete search history.

(56) References Cited

U.S. PATENT DOCUMENTS 10,225,867 B2 * 3/2019 Nagaraja .......... H04W 74/0833
10,715,373 B2 * 7/2020 Kim .................... H04L 27/2666
(Continued)

FOREIGN PATENT DOCUMENTS

| KR | 10-2017-0057835 A | 5/2017 |
|---|---|---|
| WO | 2016154551 A1 | 9/2016 |

*Primary Examiner* — Amancio Gonzalez (57) ABSTRACT

An unmanned aerial vehicle (UAV) receives a set of Random Access preambles, determines its UAV status, and selects a Random Access preamble from the set of Random Access preambles. In some cases, the set of Random Access preambles are allocated for use by UAVs and are common to a plurality of neighboring cells. The UAV transmits the selected Random Access preamble to multiple neighboring cells. One of the neighboring cells that received the selected Random Access preamble transmits a Random Access Response to the UAV. The UAV determines which cell sent the Random Access Response, reselects to the cell that sent the Random Access Response, and transmits a Radio Resource Control (RRC) Connection Establishment Request to the reselected cell. Upon completion of a Random Access Channel (RACH) procedure, the reselected cell becomes the serving cell for the UAV.

24 Claims, 4 Drawing Sheets

(51) Int. Cl.
*H04W 76/10* (2018.01)
*H04B 7/185* (2006.01)

(56) References Cited

U.S. PATENT DOCUMENTS

| | | |
|---|---|---|
| 10,764,917 B2* | 9/2020 | Byun .................. H04W 72/042 |
| 2010/0278037 A1 | 11/2010 | Jen et al. |
| 2013/0053065 A1 | 2/2013 | Xiao et al. |
| 2014/0335863 A1 | 11/2014 | Wu et al. |
| 2015/0365157 A1 | 12/2015 | Yang et al. |
| 2016/0068267 A1 | 3/2016 | Liu et al. |
| 2017/0064601 A1 | 3/2017 | Kubota et al. |
| 2018/0069606 A1* | 3/2018 | Jung .................... H04W 48/20 |
| 2018/0220450 A1* | 8/2018 | Aiba ................. H04W 72/0446 |

* cited by examiner

METHOD FOR CONNECTION ESTABLISHMENT USING COMMON RANDOM ACCESS PREAMBLE

CLAIM OF PRIORITY

The present application claims priority to U.S. Provisional Application No. 62/649,125 filed on Mar. 28, 2018, and U.S. Provisional Application No. 62/527,771 filed on Jun. 30, 2017, both entitled "METHOD FOR CONNECTION ESTABLISHMENT USING COMMON RANDOM ACCESS PREAMBLE", and assigned to the assignee hereof.

FIELD

This invention generally relates to wireless communications and more particularly to connection establishment between an unmanned aerial vehicle and a network.

BACKGROUND

Aerial vehicles or unmanned aerial vehicles (UAV), such as drones, have received increasing interest in the past few years. UAVs can be used to perform many different applications, including package delivery, real-time imaging, video surveillance, solar farm inspection, fire and storm assessment, search-and-rescue, monitoring of critical infrastructure, and wildlife conservation. Many of these emerging use cases could benefit from connecting the UAV to a cellular network as a user equipment (UE) device.

SUMMARY

An unmanned aerial vehicle (UAV) receives a set of Random Access preambles, determines its UAV status, and selects a Random Access preamble from the set of Random Access preambles. In some cases, the set of Random Access preambles are allocated for use by UAVs and are common to a plurality of neighboring cells. The UAV transmits the selected Random Access preamble to multiple neighboring cells. One of the neighboring cells that received the selected Random Access preamble transmits a Random Access Response to the UAV. The UAV determines which cell sent the Random Access Response, reselects to the cell that sent the Random Access Response, and transmits a Radio Resource Control (RRC) Connection Establishment Request to the reselected cell. Upon completion of a Random Access Channel (RACH) procedure, the reselected cell becomes the serving cell for the UAV.

DETAILED DESCRIPTION

There are a number of important considerations when connecting an unmanned aerial vehicle (UAV) to a network as a user equipment (UE) device. One example of a network to which the UAV can be connected is a 3rd Generation Partnership Project (3GPP) Long-Term Evolution (LTE) network. Once the UAV connects to the network as a UE device and selects a serving cell, circumstances may change (e.g., due to UAV movement, signal degradation, network congestion, etc.) that trigger the UAV to perform a handover or reselect another cell (e.g., a neighboring cell).

In a CONNECTED mode (e.g., state), the UAV may be instructed to perform a handover to another cell, if the criteria for a handover are satisfied. In an IDLE mode (e.g., state), the UAV may "camp" on one or more cells. While camping on the one or more cells, the UAV can receive control information, such as System Information Blocks (SIBs), from the cells on which the UAV is camped. Based on the signals received from the one or more neighboring cells, the UAV determines whether to execute a reselection procedure, which will be discussed more fully below.

One of the challenges of connecting a UAV to a network is the potential for ping-ponging during reselections and handovers since the UAV's downlink measurements may result in multiple cells meeting the reselection or handover triggering criteria. For example, the UAV, which is already connected to a first cell (e.g., serving cell), may reselect a second cell (e.g., neighboring cell) based on the System Information Blocks (SIBs) provided by the first cell. However, the UAV may then reselect the first cell as soon as the UAV is camped on the second cell since the UAV must follow the reselection rules from the first cell. Thus, the repeated reselecting (or handing over) back and forth between two cells is referred to as "ping-ponging." The level of ping-ponging will largely depend on the network implementation and the criteria used for reselection or handover.

One of the consequences of the frequent reselections is the difficulty for the network to implement load balancing. The main concern for load balancing is the need to control the cell where a UE device requests connection establishment. Since connection establishment for a UE device is performed on the cell that is serving the UE device, it is important for the network to control the cell on which the UE device (e.g., the UAV) should camp. If too many UE devices perform connection establishment on the same cell, the cell can quickly become overloaded. Currently, the network has the option to control the reselection priorities (both frequency and cell priority) of the UE devices using dedicated signaling or with SIBs. However, the use of these mechanisms may not be optimal for UAVs.

Another challenge of connecting a UAV to a network is when the UAV is flying well above a base station (eNB), the uplink signal, which is transmitted from the UAV, may be received by multiple cells. In one scenario, the uplink signal from the UAV may be considered as interference to neighboring cells, which may negatively impact the services provided to terrestrial UE devices (e.g., cell phones). To prevent such uplink interference, one or more cells that are not providing services to the UAV may vary their antenna beam patterns to steer away from the interfering UAV. In addition, the cell that is providing services to the UAV (e.g., serving cell or serving base station) may steer its antenna beam pattern towards the UAV.

Based on the above observations, there is a need for the network to manage reselection, load balancing, and interference when connecting a UAV to the network. The examples described herein include a method and a system in which the network will be able to dynamically decide which of the cells reachable by the UAV will handle the UAV's connection establishment request. Presumably, the cell(s) that are not highly loaded may be candidates for handling the connection request from the UAV.

One of the potential solutions is for multiple cells to have the opportunity to respond to the Random Access (RA) preamble transmission from the UAV. The RA Response may be sent by one of the neighbor cells and not just the UAV's serving cell. If the neighbor cell responds to the RA preamble transmission by sending an RA Response to the UAV, then the UAV should reselect to that cell and send an RRC Connection Establishment Request to that cell instead of to the original serving cell. It is assumed, based on network coordination, that only one of the cells will send an RA Response to the UAV making the connection establishment request.

Figure 1:
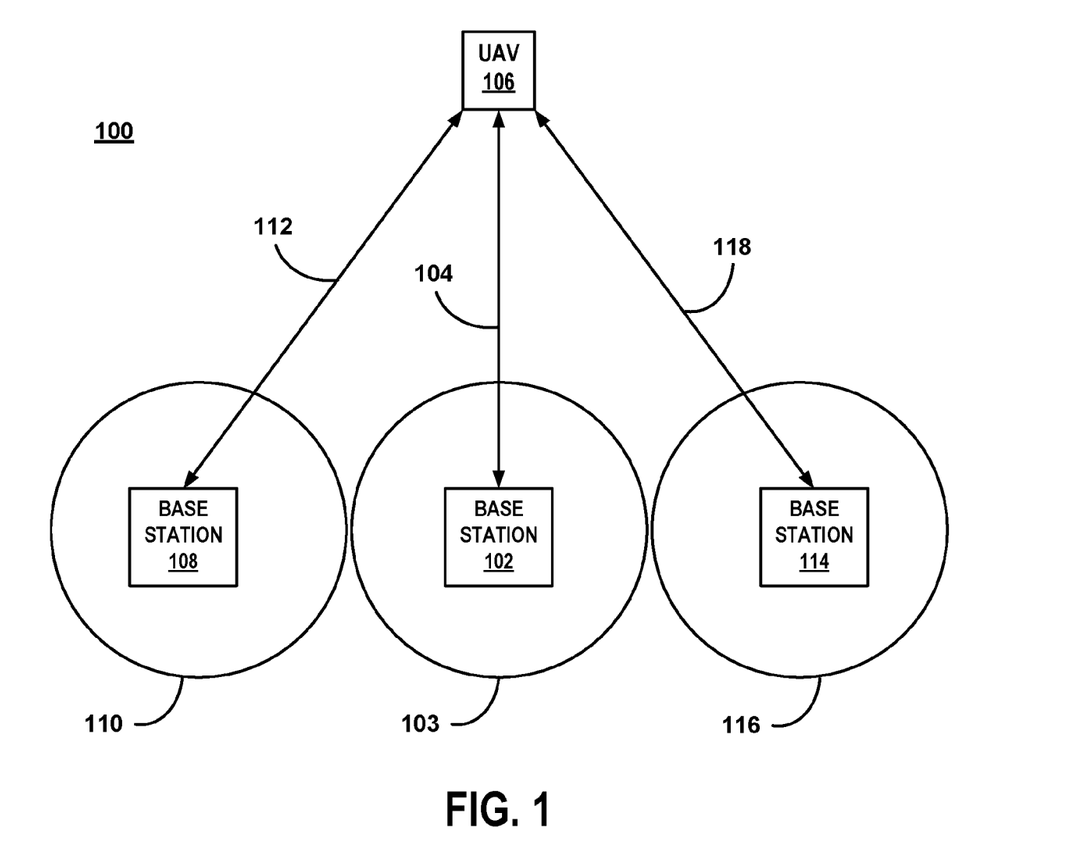
FIG. 1 is a block diagram of a system for an example in which an unmanned aerial vehicle (UAV) establishes a connection with the network using a Random Access preamble.

FIG. 1 is a block diagram of a communication system for an example in which an unmanned aerial vehicle (UAV) establishes a connection with the network using a Random Access preamble. The communication system 100 is part of a radio access network (not shown) that provides various wireless services to UE devices that are located within the respective service areas of the various base stations that are part of the radio access network. The base station 102 provides wireless services to UAV 106, which functions as a UE device in the examples herein. The base station 102 communicates with UAV 106 via communication link 104. Although the UAV 106 is located above service area 103 of the base station 102 in FIG. 1, base station 102 is the serving base station for the UAV 106. For example, although the service areas 103, 110, 116 are shown as two-dimensional areas in FIG. 1, it is understood that for purposes of providing services to a UAV, the service areas actually extend upwards vertically to provide services to UAVs that may be located at various altitudes above the service areas shown in FIG. 1. In this regard, it is worth noting that, similar to the coverage area that can be provided to traditional, terrestrial UE devices by a base station, the coverage area that can be provided to a UAV by a base station can also be affected by distance, environmental conditions, obstructions, and interference.

In the example shown in FIG. 1, communication link 104 is a Uu link between the UAV 106 and the base station (eNB) 102. Communication link 104 is configured to provide downlink communication from the base station 102 to the UAV 106 and to provide uplink communication from the UAV 106 to the base station 102.

In the interest of clarity and brevity, communication system 100 is shown as having only three neighboring base stations 102, 108, 114. However, in other examples, communication system 100 could have any suitable number of base stations. In the example shown in FIG. 1, base station 102 is considered to be a serving base station since it is providing wireless services to UAV 106. However, neighbor base stations 108, 114 are also capable of providing wireless services to the UAV 106 via communication links 112, 118, respectively. Communication links 112, 118 are similar to communication link 104. If the UAV 106 reselects to either base station 108 or 114, then the reselected base station would become the serving base station, and base station 102 would become a neighboring base station. For the purposes of the examples described herein, base stations are considered to be neighboring each other if they are relatively close to each other and/or the UAV 106 can simultaneously receive signals from each of the neighboring base stations at a given time.

Base station 102, which is sometimes referred to as an eNodeB or eNB, communicates with the UAV 106 by transmitting downlink signals via communication link 104. Base station 102 also receives uplink signals transmitted from the UAV 106 via communication link 104. As used herein, the terms "base station" and "cell" are interchangeable. In some cases, the serving cell is provided by a first base station, and the neighboring cells are provided by second and third base stations, respectively. However, in other cases, a serving cell and one or more of the neighboring cells may be provided by the same base station.

Figure 2A:
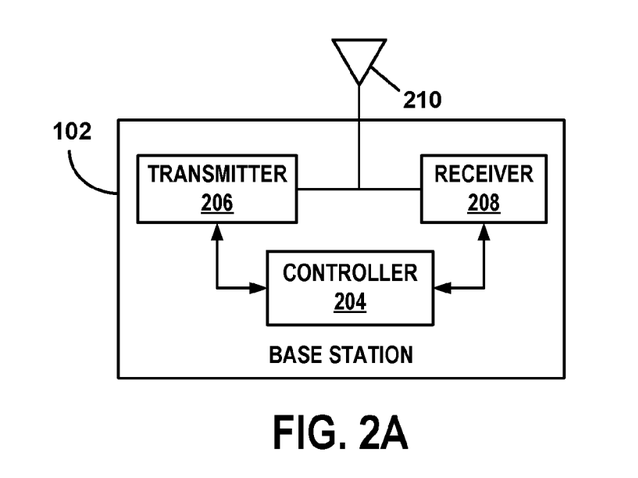
FIG. 2A is a block diagram of an example of the base stations shown in FIG. 1.

Base station 102 is connected to the network through a backhaul (not shown) in accordance with known techniques. As shown in FIG. 2A, base station 102 comprises controller 204, transmitter 206, and receiver 208, as well as other electronics, hardware, and code. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the downlink signals to be transmitted via communication link 104 and, in so doing, can apply any one of a plurality of modulation orders. The demodulator demodulates any uplink signals received at the base station 102 in accordance with one of a plurality of modulation orders.

Returning to FIG. 1, the communication system 100 provides various wireless services to the UAV 106 via base station 102. For the examples herein, the communication system 100 operates in accordance with at least one revision of the 3rd Generation Partnership Project Long Term Evolution (3GPP LTE) communication specification. In the example shown in FIG. 2B, the UAV 106 circuitry is configured to communicate directly with the base station 102. For example, the UAV 106 receives downlink signals via communication link 104 using antenna 212 and receiver 214. The UAV 106 transmits uplink signals using transmitter 218 and antenna 212.

Figure 2B:
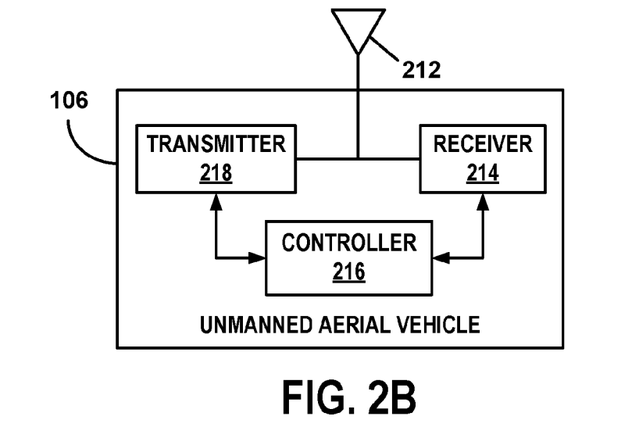
FIG. 2B is a block diagram of an example of the UAV shown in FIG. 1.

Besides antenna 212 and receiver 214, the UAV 106 further comprises controller 216 and transmitter 218, as well as other electronics, hardware, and code. The UAV 106 is any fixed, mobile, or portable equipment that performs the functions described herein. The various functions and operations of the blocks described with reference to the UAV 106 may be implemented in any number of devices, circuits, or elements. Two or more of the functional blocks may be integrated in a single device, and the functions described as performed in any single device may be implemented over several devices.

For the examples described herein, the UAV 106 is any wireless communication device that is capable of flight without having a human pilot aboard. A drone would be one example of UAV 106. In the instances where the UAV 106 is a drone, the flight of the UAV 106 may operate with various degrees of autonomy, either under remote control by a human operator or autonomously by an onboard computer. In other cases, the UAV 106 may be a kite whose height can be manually adjusted by a human operator. In still other cases, the UAV 106 may be a kite whose height can be adjusted by an adjustable mechanized tether, which can be controlled by a human operator, by a programmed algorithm, or by the UAV 106 itself.

The controller 216 of the UAV 106 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device (e.g., UAV 106).

The transmitter 218 includes a modulator (not shown), and the receiver 214 includes a demodulator (not shown). The modulator can apply any one of a plurality of modulation orders to modulate signals prior to transmission. The demodulator demodulates received signals in accordance with one of a plurality of modulation orders.

Normally, the preambles for the Random Access Channel (RACH) procedure are configured independently for each cell. However, for some of the examples described herein, a set of preambles are allocated specifically for UAVs, and one or more cells may share these allocated, UAV-specific preambles at the same time. The Information Elements related to Physical Random Access Channel (PRACH) configuration are specified in 3GPP Technical Specification 36.331 V14.2.2, "Radio Resource Control (RRC); Protocol specification (Release 14)" under "PRACH-Config" while the generic random access parameters are provided under "RACH-ConfigCommon," both of which are listed under "RadioResourceConfigCommon" and conveyed to all UE devices via "SystemInformationBlockType 2" or SIB2. In some cases, the transmitter 218 of the UAV 106 is configured to transmit a selected Random Access Preamble based on an Information Element (e.g., RACH-ConfigCommon) that is common to every cell 102, 108, 114 that is using the Random Access preambles.

In operation, the UAV 106 receives, via antenna 212 and receiver 214, a set of Random Access preambles. The preambles are broadcasted by the serving cell 102 in the SIB2. After receiving the preambles, the UAV 106 stores the preambles in memory such that the latest SIB2 is stored and the latest preambles are available for a connection request. In some cases, the preambles are common to (e.g., used simultaneously by) a plurality of cells (e.g., 102, 108, 114). In other cases, the preambles are applicable to UAVs (e.g., allocated for use by UAVs).

Once the UAV 106 receives the set of Random Access preambles, the UAV 106 utilizes controller 216 to determine the UAV status of the UAV 106 based on one or more network defined requirements. The network defined requirements may be pre-configured or may be provided by the network through the serving cell 102. In one example, the serving cell broadcasts the network requirements in the SIB. The network criteria may be based on a combination of the UAV's altitude, speed, the number of suitable cells available to the UAV to camp and/or simply based on the UAV's GNSS location. Stated differently, certain network requirements must be satisfied before the UAV 106 can be treated as a UAV by the network. For example, one or more of the following network defined requirements may be used to confirm the UAV status of a particular UAV 106.

First, the network may require that the UAV status of a UAV 106 is based on a number of cells on which the UAV 106 can camp simultaneously (e.g., the number of cells that can be considered suitable for serving UAVs). In this regard, it is assumed that small cells with higher carrier frequencies cannot serve UAVs.

Second, the network may require that the UAV status of a UAV 106 is based on whether a first signal received from a first cell (e.g., serving cell 102) meets a first received signal threshold requirement and whether a second signal received from a second cell (e.g., neighboring cell 108) meets a second received signal threshold requirement. More specifically, the network may define specific Reference Signals Received Power (RSRP) or Reference Signals Received Quality (RSRQ) threshold requirements for the serving cell and, separately, for at least one neighbor cell. The threshold requirements (e.g., one for the serving cell 102 and one for the neighbor cell 108) must both be simultaneously satisfied in order for the UAV 106 to confirm its UAV status.

Third, the network may require that the UAV status of a UAV 106 is based on whether an altitude at which the UAV 106 is located meets a height (or altitude) threshold requirement. The height or altitude of the UAV 106 can be characterized in any suitable manner, including a distance above the median sea level (MSL), a distance above the height of the base station, a distance above ground level (AGL), and/or an altitude (e.g., absolute altitude, true altitude, pressure altitude, or density altitude).

Once the UAV status of the UAV 106 is confirmed, the UAV 106 determines whether it needs to perform connection establishment. Connection establishment may be needed for performing data transfer or registration, including Tracking Area Updates. Thus, before the UAV 106 selects one of the Random Access preambles for transmission, the UAV 106 must be sure that it will be able to camp on any of the cells that may receive the Random Access preamble (e.g., all the cells configured with the common Random Access preambles and that can be considered as suitable cells to serve the UAV 106). This ensures that the UAV 106 will be able to receive the Random Access Response from any of the cells that are expected to receive the Random Access preamble. Otherwise, the UAV 106 may not receive the Random Access Response, which is undesirable.

Figure 3:
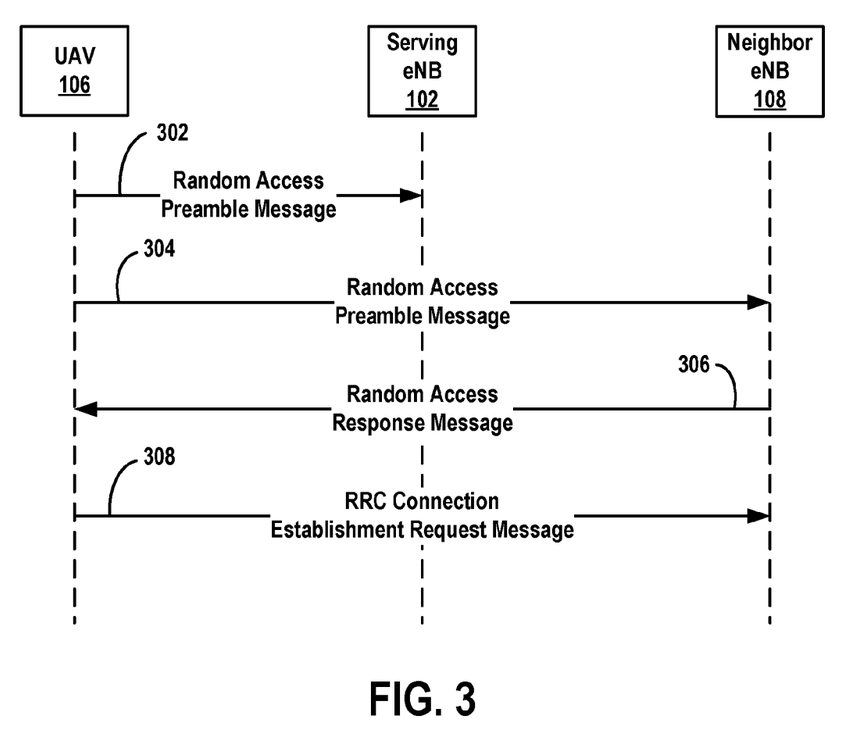
FIG. 3 is a messaging diagram of an example in which a UAV establishes a connection with the network using a Random Access preamble.

Once the UAV 106 determines that it needs to perform connection establishment, the UAV 106 utilizes controller 216 to select one of the Random Access preambles from the set of Random Access preambles. The UAV 106 utilizes transmitter 218 and antenna 212 to transmit the selected Random Access preamble in one or more signals to multiple cells 102, 108, 114. Each of the multiple cells 102, 108, 114 utilize their respective antennas 210 and receivers 208 to receive the signal(s) containing the selected Random Access preamble. The signal containing the selected Random Access preamble being sent to the serving base station (cell) 102 is represented in FIG. 3 by signal 302. The signal containing the selected Random Access preamble being sent to a neighboring base station (cell) 108 is represented in FIG. 3 by signal 304. However, in other examples, the signals 302, 304 can be sent as a single signal that is received by both cells 102, 108.

In some cases, the network also identifies, via SIBs or dedicated signaling, which cells will be monitoring the Random Access preambles that are common to (e.g., shared by) the cells 102, 108, 114. The decision of the number of cells 102, 108, 114 that should be configured to monitor the common Random Access preambles is partially dependent on the capabilities of the UAV 106 since the UAV 106 may need multiple receivers to simultaneously monitor for transmissions from the cells 102, 108, 114 after the UAV 106 transmits the selected Random Access preamble.

After the UAV 106 transmits the Random Access preamble, the UAV 106 begins to monitor all the cells 102, 108, 114 that will potentially send a Random Access Response to the UAV 106. As stated previously, it is assumed the UAV 106 has multiple receivers 214 or a single receiver 214 that is/are capable of simultaneously monitoring transmissions from all the neighboring cells 102, 108, 114 that received the selected Random Access preamble from the UAV 106. It is also assumed that the UAV 106 will be able to determine which cell sends the Random Access Response since the UAV 106 is able to simultaneously monitor transmissions from all the cells 102, 108, 114.

As mentioned above, the network will be able to dynamically decide which of the cells 102, 108, 114 reachable by the UAV 106 will handle the connection establishment request of the UAV 106. Presumably, the cell(s) that are not highly loaded may be candidates for handling the connection establishment request from the UAV 106. Once the network selects which cell 108 will handle the connection establishment request, the network instructs the selected cell 108 to transmit a Random Access Response to the UAV 106. The neighbor cell 108 transmits the Random Access Response to the UAV 106 using its transmitter 206 and antenna 210. The UAV 106 receives the Random Access Response via its antenna 212 and receiver 214. The signal containing the Random Access Response is represented in FIG. 3 by signal 306.

Upon receipt of the Random Access Response from the neighbor cell 108, the UAV 106 utilizes controller 216 to determine which cell sent the Random Access Response. In response to determining that the neighbor cell 108 sent the Random Access Response, the UAV 106 utilizes controller 216 to reselect to the neighbor cell 108. Thus, the usual priority for cell reselection does not apply at this point.

The UAV 106 transmits, using transmitter 218 and antenna 212, a Radio Resource Control (RRC) Connection Establishment Request to the neighbor cell 108. More specifically, the UAV 106 sends the RRC Connection Establishment Request using the Time Alignment (TA) and uplink resources that the UAV 106 received in the Random Access Response, according to existing RACH procedure. The neighbor cell 108 receives the RRC Connection Establishment Request with its antenna 210 and receiver 208. The signal containing the RRC Connection Establishment Request is represented in FIG. 3 by signal 308. Upon completion of the RACH procedure, cell 108 becomes the serving cell for the UAV 106.

FIG. 3 is a messaging diagram of an example in which a UAV establishes a connection with the network using a Random Access preamble. FIG. 3 depicts the control messages that are transmitted between the UAV 106, the serving base station (cell) 102, and a neighbor base station (cell) 108. In the interest of clarity and brevity, not all of the messages that are transmitted between the UAV and the base stations are included in FIG. 3. Moreover, one or more of the messages that are shown in FIG. 3 may be omitted. Likewise, additional messages may be included beyond those shown in FIG. 3 that facilitate the UAV 106 performing a connection establishment procedure with a neighbor cell 108.

Initially, the UAV 106 is being served by cell 102, has received a set of Random Access preambles, has determined its own UAV status based on network defined requirements, has determined that the UAV 106 needs to perform connection establishment, and has selected a Random Access preamble. The UAV 106 transmits the selected Random Access preamble in one or more signals to multiple cells 102, 108. Each of the multiple cells 102, 108 utilize their respective antennas 210 and receivers 208 to receive the signal(s) containing the selected Random Access preamble. The signal containing the selected Random Access preamble being sent to the serving base station (cell) 102 is represented in FIG. 3 by signal 302. The signal containing the selected Random Access preamble being sent to a neighboring base station (cell) 108 is represented in FIG. 3 by signal 304. However, in other examples, the signals 302, 304 can be sent as a single signal that is received by both cells 102, 108.

After the UAV 106 transmits the Random Access preamble, the UAV 106 begins to monitor all the cells 102, 108 that will potentially send a Random Access Response to the UAV 106. As stated previously, it is assumed the UAV 106 has multiple receivers 214 or a single receiver 214 that is/are capable of simultaneously monitoring transmissions from all the neighboring cells 102, 108. It is also assumed that the UAV 106 will be able to determine which cell sends the Random Access Response since the UAV 106 is able to simultaneously monitor transmissions from all the cells 102, 108.

As mentioned above, the network will be able to dynamically decide which of the cells 102, 108 reachable by the UAV 106 will handle the connection establishment request of the UAV 106. Presumably, the cell(s) that are not highly loaded may be candidates for handling the connection establishment request from the UAV 106. Once the network selects which cell 108 will handle the connection establishment request, the network instructs the selected cell 108 to transmit a Random Access Response to the UAV 106. The neighbor cell 108 transmits the Random Access Response to the UAV 106. The signal containing the Random Access Response is represented in FIG. 3 by signal 306.

Upon receipt of the Random Access Response from the neighbor cell 108, the UAV 106 determines which cell sent the Random Access Response. In response to determining that the neighbor cell 108 sent the Random Access Response, the UAV 106 reselects to the neighbor cell 108. The UAV 106 transmits a Radio Resource Control (RRC) Connection Establishment Request to the neighbor cell 108. The signal containing the RRC Connection Establishment Request is represented in FIG. 3 by signal 308. Upon completion of the RACH procedure, cell 108 becomes the serving cell for the UAV 106.

Figure 4:
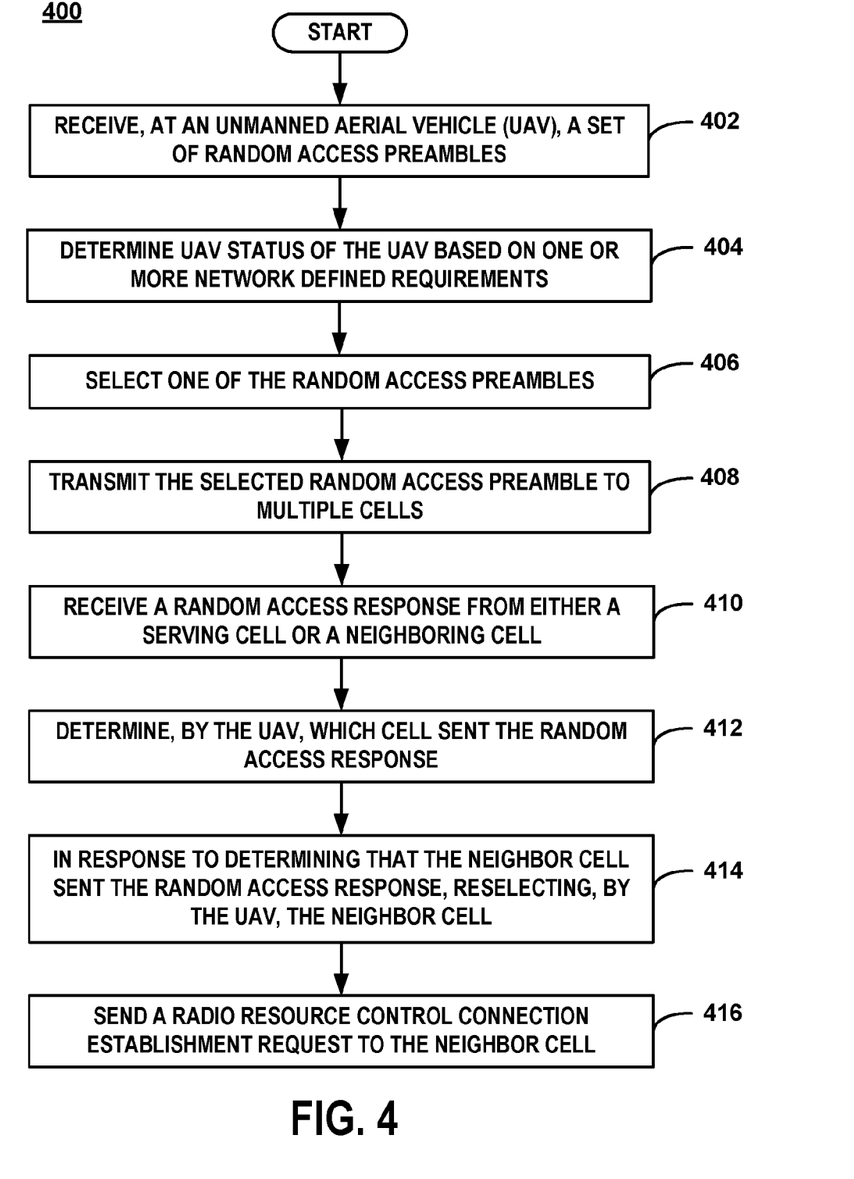
FIG. 4 is a flowchart of an example of a method in which a UAV establishes a connection with the network using a Random Access preamble.

FIG. 4 is a flowchart of an example of a method in which a UAV establishes a connection with the network using a Random Access preamble. The steps of method 400 may be performed in a different order than described herein and shown in the example of FIG. 4. Furthermore, in some examples, one or more of the steps may be omitted. Moreover, in other examples, one or more additional steps may be added. In some cases, multiple steps may be performed in parallel.

In the example shown in FIG. 4, the method 400 begins at step 402, in which the UAV 106 receives a set of Random Access preambles. In some cases, the preambles are common to a plurality of cells (e.g., 102, 108, 114). In other cases, the preambles are applicable to UAVs (e.g., allocated for use by UAVs).

At step 404, the UAV 106 determines the UAV status of the UAV 106 based on one or more network defined requirements. For example, the network may require that the UAV status of UAV 106 is based on a number of cells on which the UAV 106 can camp simultaneously (e.g., the number of cells that can be considered suitable for serving UAVs). The network may require that the UAV status of a UAV 106 is based on whether a first signal received from a first cell (e.g., serving cell 102) meets a first received signal threshold requirement and whether a second signal received from a second cell (e.g., neighboring cell 108) meets a second received signal threshold requirement, as described above. The network may require that the UAV status of UAV 106 is based on whether an altitude at which the UAV 106 is located meets a height (or altitude) threshold requirement, as described above. Once the UAV status of the UAV 106 is confirmed, the UAV 106 determines that the UAV 106 needs to perform connection establishment.

At step 406, the UAV 106 selects one of the Random Access preambles from the set of Random Access preambles. At step 408, the UAV 106 transmits the selected Random Access preamble in one or more signals to multiple cells 102, 108. The signal containing the selected Random Access preamble being sent to the serving base station (cell) 102 is represented in FIG. 3 by signal 302. The signal containing the selected Random Access preamble being sent to a neighboring base station (cell) 108 is represented in FIG. 3 by signal 304. However, in other examples, the signals 302, 304 can be sent as a single signal that is received by cells 102, 108.

As mentioned above, the network will be able to dynamically decide which of the cells 102, 108 reachable by the UAV 106 will handle the connection establishment request of the UAV 106. Presumably, the cell(s) that are not highly loaded may be candidates for handling the connection establishment request from the UAV 106. Once the network selects which cell 108 will handle the connection establishment request, the network instructs the selected cell 108 to transmit a Random Access Response to the UAV 106. At step 410, the neighbor cell 108 transmits the Random Access Response, and the UAV 106 receives the Random Access Response. The signal containing the Random Access Response is represented in FIG. 3 by signal 306.

At step 412, the UAV 106 determines which cell sent the Random Access Response. In response to determining that the neighbor cell 108 sent the Random Access Response, the UAV 106 reselects to the neighbor cell 108, at step 414. At step 416, the UAV 106 transmits a Radio Resource Control (RRC) Connection Establishment Request to the neighbor cell 108. The signal containing the RRC Connection Establishment Request is represented in FIG. 3 by signal 308. Upon completion of the RACH procedure, cell 108 becomes the serving cell for the UAV 106.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, at an unmanned aerial vehicle (UAV), a set of Random Access preambles;
   selecting one of the Random Access preambles; and
   transmitting the selected Random Access preamble to multiple cells.

2. The method of claim 1, wherein one or more of the Random Access preambles are common to a plurality of cells.

3. The method of claim 1, wherein the Random Access preambles are applicable to UAVs.

4. The method of claim 1, further comprising:
   determining UAV status of the UAV based on one or more network defined requirements.

5. The method of claim 4, wherein the UAV status is based on a number of cells on which the UAV can camp on simultaneously.

6. The method of claim 4, wherein the UAV status is based on:
whether a first signal received from a first cell meets a first received signal threshold requirement, and
whether a second signal received from a second cell meets a second received signal threshold requirement.

7. The method of claim 4, wherein the UAV status is based on whether an altitude at which the UAV is located meets a height threshold requirement.

8. The method of claim 1, wherein transmitting the selected Random Access preamble is based on an Information Element that is common to every cell that is using the Random Access preambles.

9. The method of claim 1, further comprising:
receiving a Random Access Response from either a first cell or a second cell.

10. The method of claim 9, further comprising:
determining, by the UAV, which cell sent the Random Access Response.

11. The method of claim 10, further comprising:
in response to determining that the second cell sent the Random Access Response, reselecting, by the UAV, the second cell.

12. The method of claim 11, further comprising:
sending a Radio Resource Control (RRC) Connection Establishment Request to the second cell.

13. A system comprising:
an unmanned aerial vehicle (UAV) comprising:
a receiver configured to receive a set of Random Access preambles,
a controller configured to select one of the Random Access preambles, and
a transmitter configured to transmit the selected Random Access preamble;
a first cell comprising a receiver configured to receive the selected Random Access preamble; and
a second cell comprising a receiver configured to receive the selected Random Access preamble.

14. The system of claim 13, wherein one or more of the Random Access preambles are common to a plurality of cells.

15. The system of claim 13, wherein the Random Access preambles are applicable to UAVs.

16. The system of claim 13, wherein the controller of the UAV is further configured to determine UAV status of the UAV based on one or more network defined requirements.

17. The system of claim 16, wherein the UAV status is based on a number of cells on which the UAV can camp on simultaneously.

18. The system of claim 16, wherein the UAV status is based on:
whether a first signal received from the first cell meets a first received signal threshold requirement, and
whether a second signal received from the second cell meets a second received signal threshold requirement.

19. The system of claim 16, wherein the UAV status is based on whether an altitude at which the UAV is located meets a height threshold requirement.

20. The system of claim 13, wherein the transmitter of the UAV is further configured to transmit the selected Random Access preamble based on an Information Element that is common to every cell that is using the Random Access preambles.

21. The system of claim 13, wherein the receiver of the UAV is further configured to receive a Random Access Response from either the first cell or the second cell.

22. The system of claim 21, wherein the controller of the UAV is further configured to determine which cell sent the Random Access Response.

23. The system of claim 22, wherein the controller of the UAV is further configured to reselect the second cell in response to determining that the second cell sent the Random Access Response.

24. The system of claim 23, wherein the transmitter of the UAV is further configured to send a Radio Resource Control (RRC) Connection Establishment Request to the second cell.

* * * * *